(12) United States Patent
Jost (10) Patent No.: US 7,185,876 B2
(45) Date of Patent: Mar. 6, 2007

(54) OVERRUN BRAKING SYSTEM AND METHOD

(75) Inventor: George J. Jost, Lake in the Hills, IL (US)

(73) Assignee: Technical Concepts, LLC, Mudelein, IL (US)

( * ) Notice: Subject to any disclaimer, the term of this patent is extended or adjusted under 35 U.S.C. 154(b) by 43 days.

(21) Appl. No.: 10/678,687

(22) Filed: Oct. 3, 2003

(65) Prior Publication Data

US 2004/0164260 A1    Aug. 26, 2004

Related U.S. Application Data

(60) Provisional application No. 60/418,135, filed on Oct. 12, 2002, provisional application No. 60/418,122, filed on Oct. 12, 2002, provisional application No. 60/418,087, filed on Oct. 12, 2002.

(51) Int. Cl.
*F16K 31/04* (2006.01)
(52) U.S. Cl. .............................. 251/129.04; 251/129.12
(58) Field of Classification Search ........... 251/129.04, 251/129.11, 129.12, 129.13
See application file for complete search history.

(56) References Cited

U.S. PATENT DOCUMENTS

| 300,468 | A | 6/1884 | Haskell et al. |
|---|---|---|---|
| 1,057,632 | A | 4/1913 | Fraser |
| 1,114,398 | A | 10/1914 | Sloan |
| 2,007,652 | A | 7/1935 | Kocour |
| 2,130,611 | A | 9/1938 | Burdick |
| 2,235,304 | A | 3/1941 | Toussaint |
| 2,355,742 | A | 8/1944 | Morehouse |
| 2,552,625 | A | 5/1951 | Filliung |
| 2,635,691 | A | 4/1953 | Filliung |
| 3,008,682 | A | 11/1961 | Filliung et al. |
| 3,008,683 | A | 11/1961 | Filliung et al. |
| 3,011,751 | A | 12/1961 | Delaney et al. |
| 3,019,453 | A | 2/1962 | Radcliffe |
| 3,056,143 | A | 10/1962 | Foster |
| 3,202,396 | A | 8/1965 | Delaney et al. |
| 3,462,769 | A | 8/1969 | Ichimoro et al. |

(Continued)

FOREIGN PATENT DOCUMENTS

JP          38-24065        11/1963

(Continued)

*Primary Examiner*—John Bastianelli
(74) *Attorney, Agent, or Firm*—Brinks Hofer Gilson & Lione (57) ABSTRACT

A flush valve system includes a sensor, a bias circuit, an electrical switch, a mechanical switch, and a flush valve. The bias circuit generates a bias signal when an activation signal is received from the sensor. The bias signal turns on the electrical switch. The mechanical switch turns on just before the electrical switch is turned off. The flush valve is coupled to the electrical and the mechanical switch to initiate fluid flow when the electrical switch is turned on and facilitate the flow until the mechanical switch is turned off. An automatic braking method includes receiving an actuation signal, actuating an electronic switch to initiate a rotation of a switch cam and the opening of a valve, actuating a mechanical switch when a cutout portion of the switch cam is in contact with a portion of the mechanical switch, and closing the valve when the portion of the mechanical switch is outside of the cutout portion.

9 Claims, 6 Drawing Sheets

U.S. PATENT DOCUMENTS

| | | |
|---|---|---|
| 3,680,406 A | 8/1972 | Bush |
| 3,695,288 A | 10/1972 | Billeter et al. |
| 3,778,023 A | 12/1973 | Billeter |
| 4,202,525 A | 5/1980 | Govaer et al. |
| 4,235,414 A | 11/1980 | Lis |
| 4,309,781 A | 1/1982 | Lissau |
| 4,505,450 A | 3/1985 | Sarrem et al. |
| 4,508,136 A | 4/1985 | Kah, Jr. |
| 4,667,350 A | 5/1987 | Ikenaga et al. |
| 4,671,485 A | 6/1987 | Saarem |
| 4,742,583 A | 5/1988 | Yoshida et al. |
| 4,793,588 A | 12/1988 | Laverty, Jr. |
| 4,805,247 A | 2/1989 | Laverty, Jr. |
| 4,817,913 A | 4/1989 | Whiteside |
| 4,839,039 A | 6/1989 | Parson et al. |
| 4,883,254 A | 11/1989 | Whiteside |
| 4,886,207 A | 12/1989 | Lee et al. |
| 4,891,864 A | 1/1990 | Laverty, Jr. |
| 4,911,401 A | 3/1990 | Holcomb et al. |
| 4,971,287 A | 11/1990 | Shaw |
| 4,972,070 A | 11/1990 | Laverty, Jr. |
| 4,989,277 A | 2/1991 | Tsutsui et al. |
| 5,025,516 A | 6/1991 | Wilson |
| 5,062,453 A | 11/1991 | Saadi et al. |
| 5,063,955 A | 11/1991 | Sakakibara |
| 5,125,621 A | 6/1992 | Parsons et al. |
| 5,155,870 A | 10/1992 | Tsutsui et al. |
| 5,169,118 A | 12/1992 | Whiteside |
| 5,187,818 A | 2/1993 | Barrett, Sr. et al. |
| 5,195,720 A | 3/1993 | Nortier |
| 5,244,179 A | 9/1993 | Wilson |
| 5,269,028 A | 12/1993 | Liso |
| 5,295,655 A | 3/1994 | Wilson et al. |
| 5,313,673 A | 5/1994 | Saadi et al. |
| D351,219 S | 10/1994 | Saadi et al. |
| 5,415,374 A | 5/1995 | Carroll et al. |
| 5,431,181 A | 7/1995 | Saadi et al. |
| 5,476,244 A | 12/1995 | Carroll et al. |
| 5,505,427 A | 4/1996 | Whiteside |
| 5,680,879 A | 10/1997 | Muderlak et al. |
| 5,730,415 A | 3/1998 | Gronwick |
| 5,881,993 A | 3/1999 | Wilson et al. |
| 5,887,848 A | 3/1999 | Wilson |
| 6,056,261 A | 5/2000 | Aparicio et al. |
| 6,105,926 A | 8/2000 | Oliver et al. |
| 6,260,576 B1 | 7/2001 | Allen |
| 6,299,127 B1 | 10/2001 | Wilson |
| 6,349,921 B1 | 2/2002 | Jahrling |
| 6,382,586 B1 | 5/2002 | Wilson et al. |
| 6,408,873 B1 | 6/2002 | Hall et al. |

FOREIGN PATENT DOCUMENTS

| | | |
|---|---|---|
| JP | 55-24389 | 8/1978 |
| JP | 55-21385 | 2/1980 |
| JP | 3-12973 | 2/1991 |
| JP | 3-58368 | 6/1991 |
| JP | 5-14272 | 2/1993 |
| JP | 11-512809 | 11/1999 |
| TW | 8411990 | 12/1996 |
| TW | 8411989 | 7/1997 |
| WO | PCT/US95/13199 | 4/1997 |
| WO | WO 97/13086 | 4/1997 |

OVERRUN BRAKING SYSTEM AND METHOD

RELATED APPLICATIONS

This application claims the benefit of U.S. Provisional Application No. 60/418,135, filed Oct. 12, 2002.

This application incorporates by reference U.S. Provisional Application No. 60/418,122 entitled "Automatic Flush Valve Actuation Apparatus Valve," filed on Oct. 12, 2002.

This application also incorporates by reference U.S. Provisional Application No. 60/418,087 entitled "Automatic Flushing Actuator For Tank Style Toilet," filed on Oct. 12, 2002.

FIELD OF THE INVENTION

This invention relates to a system and a method for controlling fluid flow, and more particularly, to a system and a method for automatically braking drive elements that control flush valves.

BACKGROUND

Some flushing systems suffer from the effects of cross-contamination. The transfer of germs from one user to another can occur when a user touches a handle that enables the flow of water into a fixture. Cross-contamination may result from hand-to-mouth, hand-to-nose, and hand-to-eye contact. An awareness of such contamination can create a reluctance to touch a fixture handle which does not promote good hygiene.

To minimize risk of transferring germs, some flushing systems use hands-free-methods to control water flow. In some systems, a passive sensor is used to detect the presence of a user. Once the user leaves an area, some devices use a rotating device to translate the rotary motion of a motor into a linear motion needed to actuate a handle.

In some rotating driven devices, the inertia of the motor shaft can cause the motor shaft to rotate beyond a desired stopping point and thus initiate multiple water flows through the fixture. Besides wasting water, such over-rotation can fatigue the rotating device and require a higher initial torque to initiate another rotation at the start of a second flushing cycle.

SUMMARY

The present invention is defined by the following claims. This description summarizes some aspects of the presently preferred embodiments and should not be used to limit the claims.

A flush valve system embodiment comprises a sensor, a bias circuit, an electrical switch, a mechanical switch, and a flush valve. Preferably, the bias circuit is configured to bias the electrical switch when an activation signal is received from the sensor. Preferably, the mechanical switch is activated when the electrical switch is turned off. The flush valve is coupled to the electrical and mechanical switch to enable fluid flow when the electrical switch is turned on and facilitate the flow until the mechanical switch is turned off.

An automatic braking method embodiment includes receiving an actuation signal, actuating the electronic switch to initiate a rotation of a switch cam and the opening of the valve, actuating a mechanical switch when a cutout portion of the switch cam is in contact with a portion of the mechanical switch, and closing the valve when the portion of the mechanical switch is outside of the cutout portion.

Further aspects and advantages of the invention are described below in conjunction with the presently preferred embodiments.

DETAILED DESCRIPTION OF THE PRESENTLY PREFERRED EMBODIMENTS

The presently preferred overrun braking system and method provides users with a hands free system and method for controlling fluid flow. The preferred system and method precisely brake a motor to a desired position. In one embodiment, the precise braking of a motor provides the system and method with a greater cam surface area to engage a contacting element.

Figure 1:
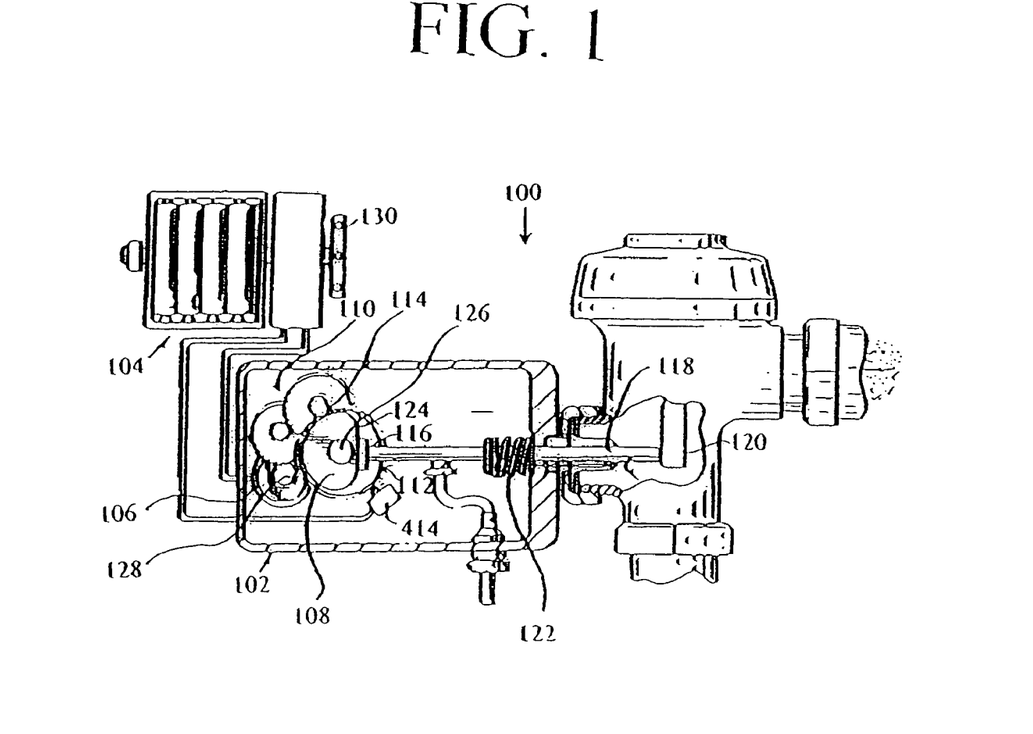
FIG. 1 is a partial cutaway view of an automatic flushing embodiment.
Figure 2:
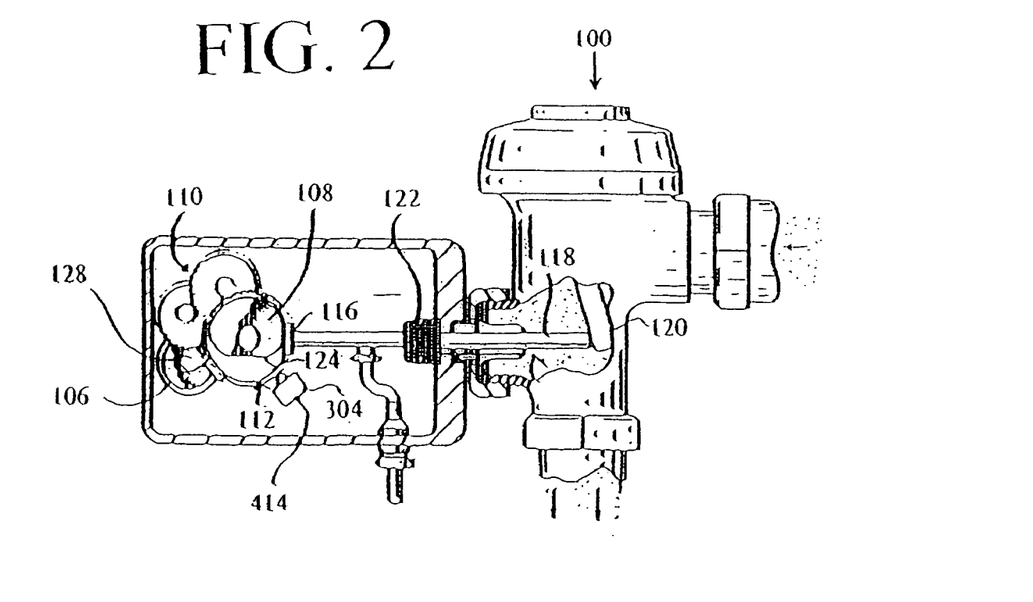
FIG. 2 is a second partial cutaway view of FIG. 1.

FIGS. 1 and 2 are partial cutaway views of an automatic flushing embodiment 100. The embodiment 100 comprises a first enclosure or housing 102 coupled to a second enclosure or power source 104. Although the embodiment 100 can be retrofitted to any flushing valve or flushing unit without disassembling those valves or units, as shown the housing 102 is mounted to a valve housing by a threaded opening. In this embodiment 100 a flushing handle has been replaced by a plunger pin 118.

Preferably, the housing 102 encloses a motor 106 that is mechanically coupled to a rod cam 108 and a switch cam 112 through a gear train 110. In this embodiment 100, the rod cam 108 and a switch cam 112 rotate through a complete revolution (360 degrees) during a flush cycle. When activated, the rod cam 108 moves a stem 120 from an inactive state shown in FIG. 1 to an active or flushing state shown in FIG. 2. As the rod cam 108 rotates from the inactive to the flushing state, preferably a parabolic portion 114 of the rod cam 108 engages and moves a face plate 116 that engages and moves the plunger pin 118 and the stem 120. Preferably, a tension device illustrated as a compression spring 122 biases the face plate 116 against a flat portion 124 of the rod cam 108 when the flushing cycle is completed. In the inactive state, the stem 120 returns to an inactive position that closes a flushing valve. In FIG. 1, the stem 120 is in a near vertical position when the flushing valve is closed. In other embodiments, the stem 120 is in other positions.

Referring to FIG. 1, preferably the motor 106 is enclosed within the housing 102. The motor 106 is mechanically coupled to a gear train 110, which is shown as a reduction gear train secured within the housing 102 in FIGS. 1 and 2. When the motor 106 is active, the gear train 110 rotates the rod and switch cams 108 and 112 in a clockwise direction as they preferably share a common shaft 126. As the rod cam 108 rotates, the parabolic portion 114 of the rod cam 108 engages and moves the face plate 116 to the right. Preferably, this movement urges the plunger pin 118 and stem 120 to the right which initiates a flushing cycle and opens the flushing valve.

Figure 3:
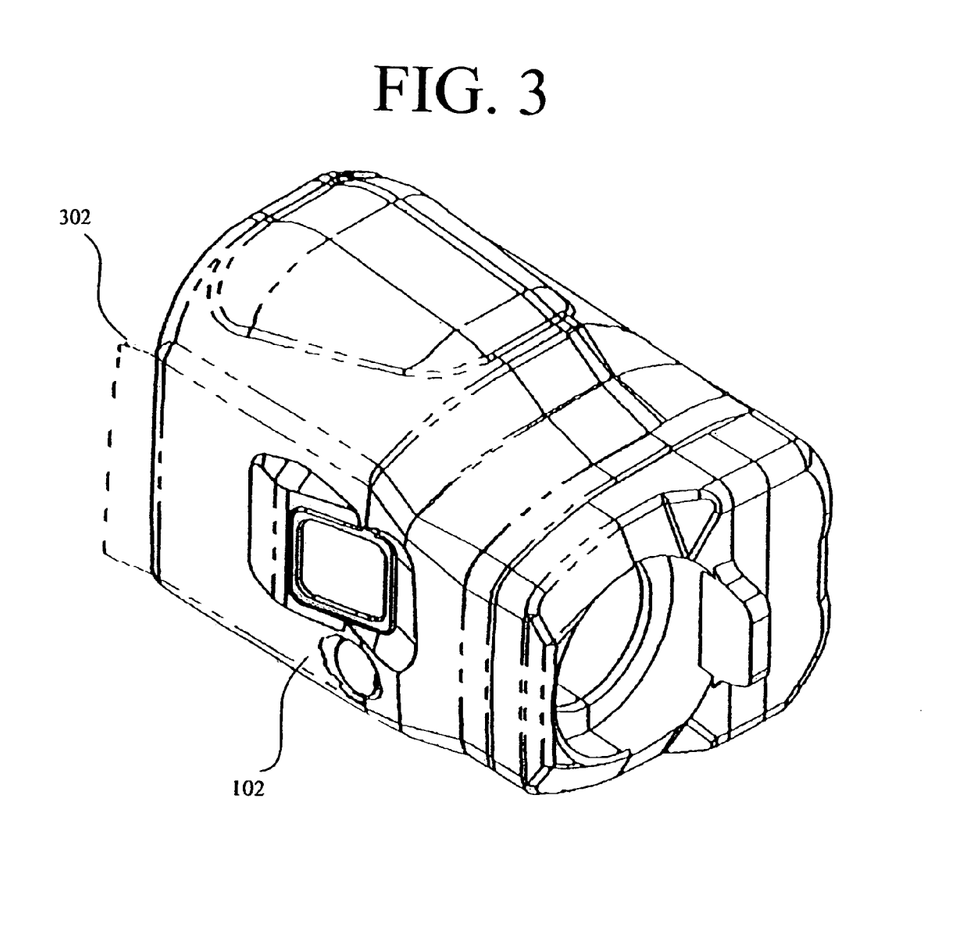
FIG. 3 is an exterior perspective view of an alternative embodiment of FIG. 1.

Preferably, automatic flush actuation occurs when a sensor 130 detects the presence of a user or a condition. The sensor 130 may be a motion detector, infra-red sensor, a body heat detector, or any other device that detects or measures something by converting non-electrical energy into electrical or optical energy. Preferably, the sensitivity range of the sensor 130 is adjustable which allows the sensor 130 to be positioned at any desired location. For example, the sensor 130 may positioned away from the housing 102 as shown in FIG. 1 or can be integrated within or form a unitary part of the housing 102. When the sensor 130 is integrated within or a unitary part of the housing 102, a portion of the sensor 130 or its lens can project from the housing 102 at an angle that ensures that the sensor 130 monitors an intended field of view. In one embodiment shown in FIG. 3, the sensor lens forms about a fifteen degree angle with a plane 302 that is substantially parallel to a flat portion of the outer surface of the housing 102. Although this feature is shown in an alternative retrofit embodiment that does not require the disassembly of the fixture (e.g., it accommodates a flushing handle), it can also be used in the presently described embodiment 100 or used in or with any other flushing device.

Figure 4:
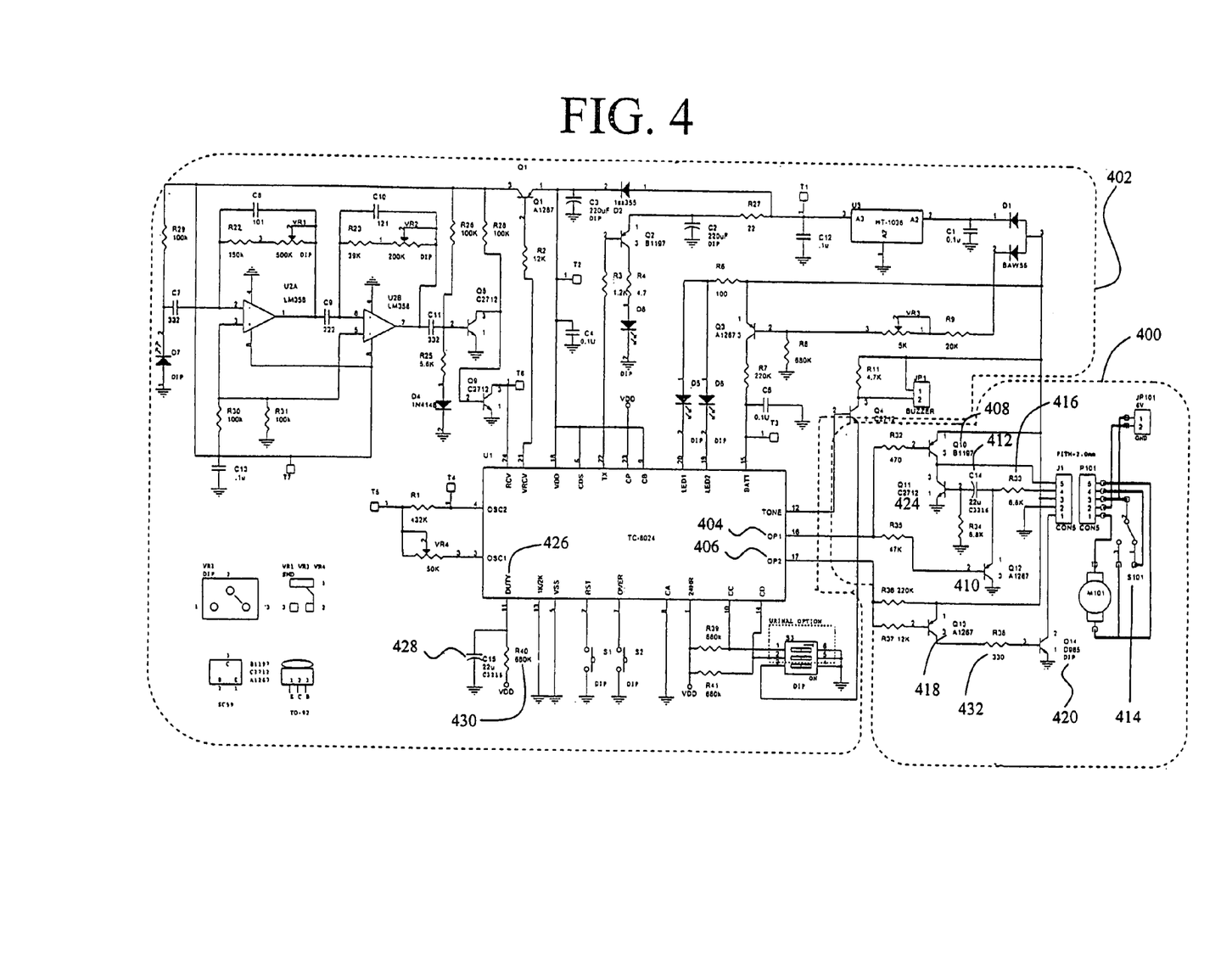
FIG. 4 is a schematic of an embodiment of an automatic braking system.

Activation of the motor 106 occurs when an activation signal is received by the sensing logic or electronics 402 that is shown interfaced to the motor brake logic 400 in FIG. 4. In this embodiment 100, an activation signal is generated when a user departs from a field of view or when a sensor generates an electrical signal. At this stage integrated circuit pin OP1 404 is driven low for seven tenths of a second and OP2 406 is driven low for a complete flushing cycle. With integrated circuit pins OP1 404 and OP2 406 in an active low state, p-n-p transistor Q10 408 supplies a voltage to the motor 106, which in this embodiment is an unregulated Direct Current six volt source. A p-n-p transistor Q12 410 discharges capacitor C14 412 and sinks the current flow through switch S101 414 and resistor R33 416 to ground, and p-n-p transistor Q13 418 biases the current sink shown as n-p-n transistor Q14 420 which initiates the rotation of the motor shaft 128, the rod cam 108, and the switch cam 112. As the motor shaft 128, rod cam 108, and switch cam 112 turn, preferably switch S101 414, which in this embodiment 100 is a micro-switch, connects poles 2 to 3 connecting the motor 106 to a supply voltage.

As the face plate 116 slides down the top portion of the rod cam 108, preferably the compression spring 122 urges the rotation of the rod cam 108, the switch cam 112, and the motor shaft 128. In this state, integrated circuit pin OP1 404 is biased high, the compression spring 122 mechanically transfers energy to the rod cam 108 and the switch cam 112 and the motor 106 operates as a generator applying a positive voltage to the collectors of p-n-p transistor Q10 408 and n-p-n transistor Q11 424.

Figure 5:
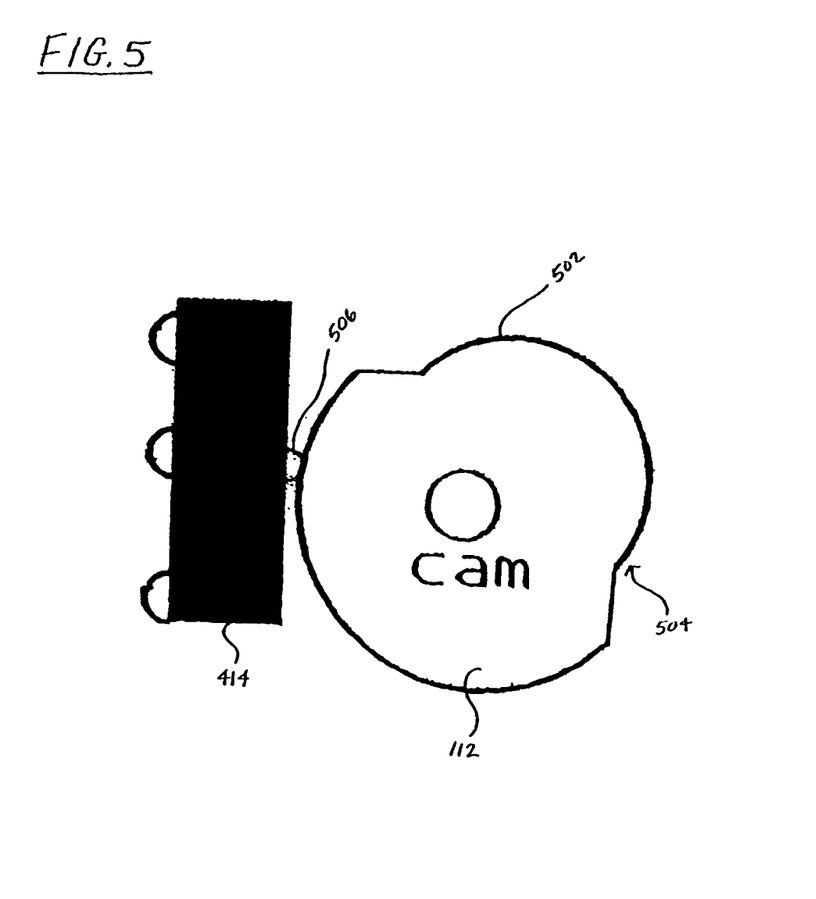
FIG. 5 is a front view of a switch cam and a mechanical switch of FIG. 1.

As electric power is generated by the motor 106, a switch knob 506 shown in FIG. 5 is released and slidably contacts a convex surface 502 that bounds a cutout portion 504 of the switch cam 112. Upon its release, the switch 414 couples poles 1 and 2 which connects the power source to the capacitor C14 412. The high rate of current initially drawn by capacitor C14 412 biases the n-p-n transistor Q11 424 on effectively grounding the motor 106. As a result, the kinetic energy of the motor 106 is converted to electric energy, and dissipates as thermal energy.

Preferably, the switch cam 112 is positioned to turn off the motor 106 just before the face plate 116 engages the flat portion 124 of the rod cam 108. In this embodiment 100, preferably the face plate 116 is not positioned on the parabolic portion 114 of the rod cam 108 during an inactive state.

Preferably, the automatic flushing embodiment 100 can also include a break control. Preferably the break control prevents the over heating or failure of the motor 106 if gears become bound, cams stick or other failures occur. Referring to FIG. 4, integrated circuit pin Duty 426 controls the output duration of integrated circuit pin OP2 406. In this embodiment an RC circuit that comprises R40 430 and C15 428 controls the duration of the bias to p-n-p transistor Q13 418 and n-p-n transistor Q14 420. Accordingly, the on time of transistor Q14 420 can be programmed to match the normal time of a flushing cycle. Although this embodiment is not limited to any specific cycle time or ranges, in one embodiment the duration of the biasing signal can vary from about seven tenths to about five seconds.

Figure 6:
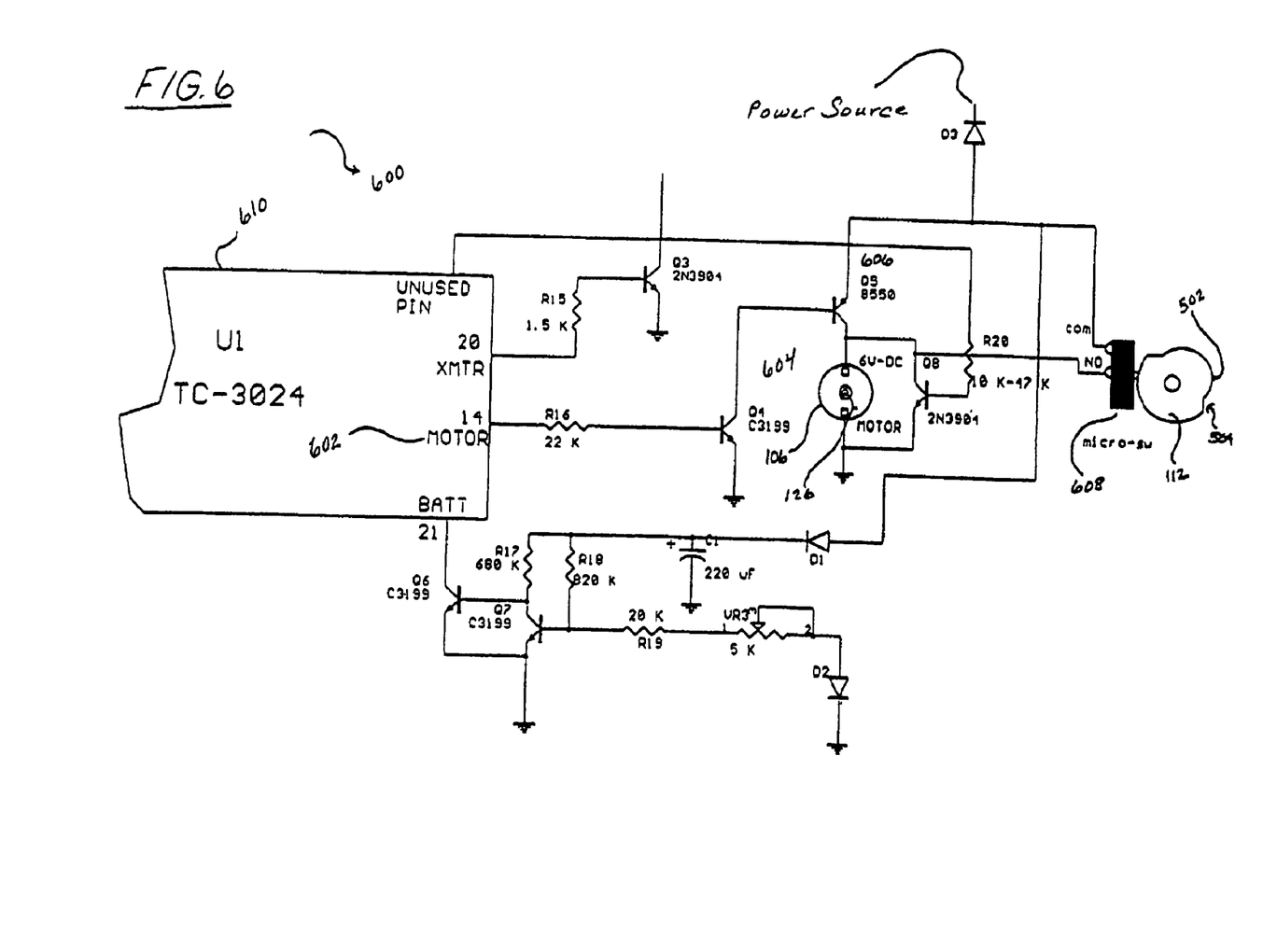
FIG. 6 is a schematic of a second embodiment of the automatic braking system.

FIG. 6 illustrates a second embodiment 600. Like the first embodiment 100, activation of the flushing cycle begins when an activation signal is received. In this embodiment 600, an activation signal is generated when a user departs from a field of view or a sensor generates an electrical or optical signal. At this state integrated circuit pin 14 602 is driven high for about seven-tenths of a second. With integrated circuit pin 14 602 in an active high state, n-p-n transistor Q4 604 biases a source switch or p-n-p transistor Q5 606 which provides power to the motor 106 and initiates the rotation of the motor shaft 128, the rod cam 108, and the switch cam 112. As the motor shaft 128, rod cam 108, and switch cam 112 turn, a single pole single throw switch S601 608 connects the motor 106 to the power source.

As the face plate 116 slides down the top portion of the rod cam 108, preferably the compression spring 122 urges the rotation of the motor 106, the rod cam 108, and the switch cam 112. As the motor 106 is biased by the compression spring 122, preferably a switch knob 506 is released and slidably contacts the convex surface 502 that bounds the cutout portion 504 of the switch cam 112. Once the switch knob 506 is outside of the cutout portion 504, a pulse from the integrated circuit 610 substantially grounds the motor 106. Preferably, the logic to detect the opening of the switch 414 to initiate the motor brake logic 400 is accomplished by software and/or hardware within the integrated circuit.

Preferably, the integrated circuit turns off the motor 106 just before the face plate 116 engages the flat portion of the rod cam 108. Preferably the face plate 116 is not positioned on the parabolic portion 114 of the rod cam 108 during an inactive state.

Preferably, the automatic flushing embodiment 600 can also include a break control. Preferably, the break control prevents the over heating or failure of the motor 106 if gears become bound, cams stick or other failures occur. While such a control has many configurations, in one embodiment the interruption of the ground to the motor 106 is controlled by an electronic, mechanical, and/or an electromechanical switch that is actuated by a control signal. Preferably, the duration of the control signal is programmed to be about equal to the duration of a flushing cycle.

Figure 7:
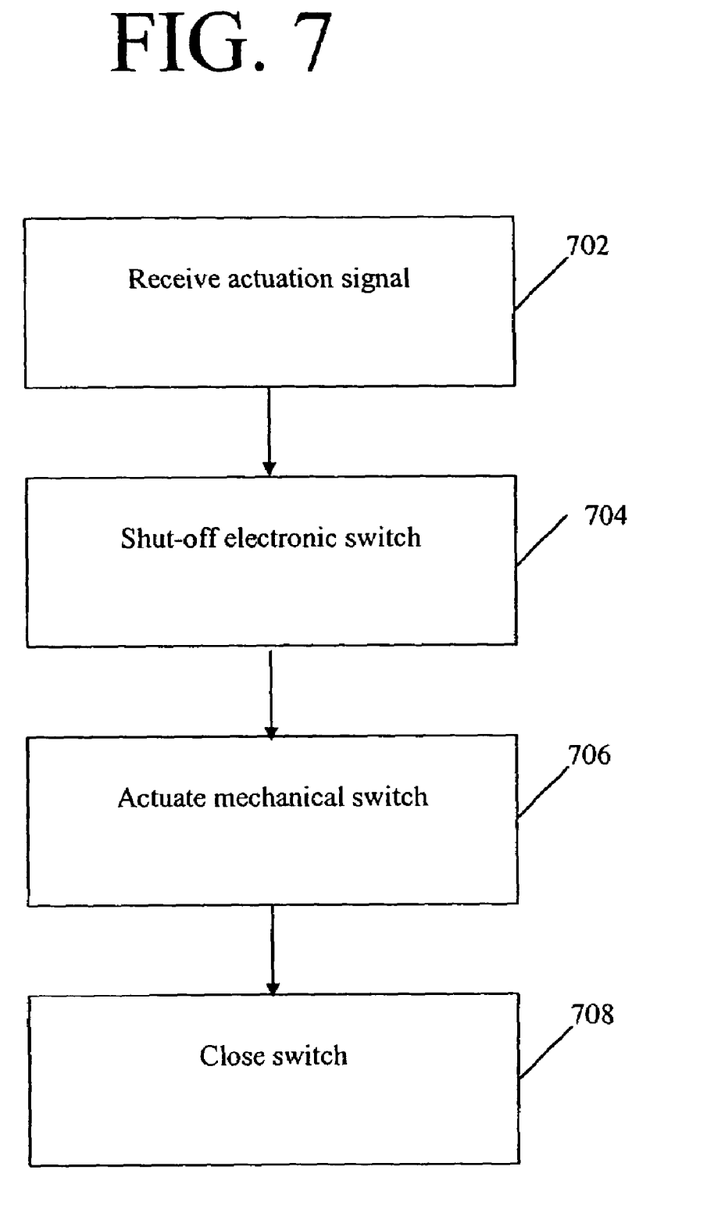
FIG. 7 is a flow diagram of a braking method.

As shown in FIG. 7, when an overrun braking method begins an actuation signal is received at act 702. Preferably, a sensor 130 or another device monitors a field of view or measures something by converting non-electrical energy into an electrical or optical signal. When activated, an electronic switch actuates the motor 106 to rotate the gear train 110, switch cam 112, and the rod cam 108 that engages the stem 120 to an active or flushing state. At act 704, the electronic switch turns off shutting-off one source of electrical power to the motor 106. Preferably the switch cam 112 has rotated sufficiently to engage the switch knob 506 to couple the source of electrical power to the motor 106 through switch S101 414. At act 706, a mechanical switch provides power to the motor 106 when the switch knob 506 comes in contact with a lower surface of the cutout portion 504. Preferably, the mechanical switch shuts off electrical power to the motor 106 when the switch knob 506 is not within the cutout portion 504. Preferably, electrical power is shut off just before the face plate 116 engages the flat portion 124 of the rod cam 108. When the face plate 116 engages the flat portion of the rod cam 108, the stem 120 returns to an inactive position and the flushing valve is closed at act 708. Preferably, in the inactive state the face plate 116 is not positioned on the parabolic portion 114 of the rod cam 108.

The above-described system and method provide provides an easy-to-install, reliable means of flushing without direct user intervention. Such a system and method can be battery operated by one or more batteries, interfaced to an outside electrical source, or interfaced to any other types of power sources. Preferably, the integrated or discrete components can be interfaced to an automatic flushing unit or retrofitted to any flushing unit or commercial or residential flushing valves.

Preferably, the overrun braking system and method can apply a braking force to a motor to prevent a cam from over running a desired position. While the system and method have been described in cam and gear embodiments, many other alternatives are possible. Such alternatives include automatic actuators, solenoid driven systems, and any other system that use flush valves for fluid distribution. Furthermore, the control logic is not limited to electrical circuits as the overrun braking system and method also embrace other control logic including optical logic, for example.

Many other alternative embodiments are also possible. For example, some system and method directly interface a ground control switch to an integrated circuit. In these alternative embodiments, integrated circuit OP2 406 shown in FIG. 4 is an active high that directly interfaces R38 432 that is coupled to n-p-n transistor Q14 420. In addition, more or fewer elements may be included or removed from the above-described embodiments. Another embodiment can couple an electrical, optical, or mechanical switch such as a micro-switch directly to the plunger pin or a push rod to sense the position of the plunger pin/push rod and initiate the braking or need for braking or need for opening of a circuit.

While some presently preferred embodiments of the invention have been described, it should be apparent that many more embodiments and implementations are possible and are within the scope of this invention. It is intended that the foregoing detailed description be regarded as illustrative rather than limiting, and that it be understood that it is the following claims, including all equivalents, that are intended to define the spirit and scope of this invention.

What is claimed is:

1. An automatic flush valve system for evacuating waste, comprising:
    a motor;
    a gear train mechanically coupled to the motor;
    a switch cam mechanically coupled to the gear train;
    a rod cam mechanically coupled to the gear train, the rod cam adapted for opening a valve;
    a braking logic electrically coupled to the motor and mechanically coupled to the switch cam; and
    a sensing logic electrically coupled to the braking logic, where the sensing logic initiates a rotation of the motor and the braking logic terminates the rotation of the motor by grounding the motor.

2. The automatic flush valve system of claim 1 further comprising a sensor, wherein the sensing logic includes a bias circuit configured to generate a bias signal to initiate the rotation of the motor when an activation signal is received from the sensor, and the braking logic includes an electrical switch configured to provide a power connection to the motor only while the bias circuit generates the bias signal and a mechanical switch configured to maintain the power connection to the motor after the electrical switch is turned off.

3. The automatic flush valve system of claim 1, further comprising a shaft coupled to the switch cam and rod cam.

4. The automatic flush valve system of claim 2, wherein the switch cam comprises a cutout portion that actuates the mechanical switch.

5. The automatic flush valve system of claim 4, wherein the cutout portion includes a convex surface.

6. The automatic flush valve system of claim 1, further comprising break control logic that interrupts a ground connection to the motor after a predetermined amount of time.

7. The automatic flush valve system of claim 6, wherein the predetermined amount of time is about equal to a flushing cycle.

8. The automatic flush valve system of claim 6, wherein the braking logic comprises an integrated circuit.

9. The automatic flush valve system of claim 6, wherein the break control logic comprises a transistor pair coupled to the sensing logic.

\* \* \* \* \*